United States Patent [19]

Platt

[11] 3,864,745

[45] Feb. 4, 1975

[54] MANUAL SOUND REPRODUCTION APPARATUS

[75] Inventor: Stephen A. Platt, Grand Haven, Mich.

[73] Assignees: Stephen A. Platt; Vernet B. Platt, both of Grand Haven, Mich.

[22] Filed: Sept. 21, 1972

[21] Appl. No.: 290,877

[52] U.S. Cl. .................... 360/96, 360/105, 226/127, 226/176, 242/201

[51] Int. Cl. ......................... G11b 5/54, G11b 15/40

[58] Field of Search ............ 274/4 D, 4 E, 4 C, 4 R; 242/201, 198, 202; 274/1 A, 11 R, 11 C, 11 D; 226/176, 127; 179/100.2 Z; 360/96, 105, 90, 94, 95, 93

[56] References Cited

UNITED STATES PATENTS

| | | | |
|---|---|---|---|
| 2,609,457 | 9/1952 | Thurm | 274/4 R |
| 3,554,465 | 1/1971 | Marukawa | 274/4 D |
| 3,666,275 | 5/1972 | Heine et al. | 274/1 A |

*Primary Examiner*—Harry N. Haroian
*Assistant Examiner*—John W. Shepperd
*Attorney, Agent, or Firm*—Price, Heneveld, Huizenga & Cooper

[57] ABSTRACT

A manually operated tape playback apparatus includes a base assembly receiving a slidable drive carriage having manually operated drive means thereon. A tape carrier positioned on the base is selectively engageable by the drive means to move the tape in forward or reverse directions. Means cooperating between the base assembly and the carriage are employed to selectively shift the carriage between a playback position whereupon a playback head on the carriage contacts the recorded tape and the drive means engages the transport in a first manner and a rewind position where the head is moved away from the tape and the drive means engages the transport in a second manner. In some embodiments, the base assembly includes a tape speed regulator coupled to a tape engaging capstan to regulate the tape playback speed.

22 Claims, 10 Drawing Figures

MANUAL SOUND REPRODUCTION APPARATUS

BACKGROUND OF THE INVENTION

The present invention relates to a manually operated portable tape playback apparatus.

In tape playback systems, particularly in small portable apparatus, the manufacturing cost resides primarily in the electrically operated drive mechanism employed for transporting the tape across a playback head. Not only is the tape transport mechanism expensive, it comprises the bulk and weight of portable tape playback apparatus. In addition, portable equipment which relies upon battery power requires several batteries to supply the relatively high current drain required for operating the transport.

Where cost is a prime consideration or in some locations such as underdeveloped areas where electricity is not generally available or where batteries are not available or are very expensive, a mechanically operated tape playback system is needed which is portable and which eliminates the expensive current consuming electrical transport drive.

Although an electrical amplifier is always required for the playback of magnetic tape, with today's technology, the amplifier can be designed to be very small and inexpensive and require little operating power. Thus, a manually operated tape playback apparatus employing such an amplifier would require considerably less current to operate than a conventional portable tape playback apparatus with an electrically operated tape transport. Also, fewer and/or less expensive batteries can be used for powering only the amplifier in such apparatus.

SUMMARY OF THE INVENTION

The apparatus disclosed and described herein satisfies the existing need for an inexpensive manually operated tape playback apparatus which can be used with reel-to-reel tape or with tape cartridges and which requires only minimal battery power for operation of an electrical amplifier used therewith. This apparatus reduces both the cost of manufacture since no electrical drive motor is required and the cost of operation since less current is required.

The apparatus may uniquely incorporate a speed regulator of the type described in my copending application entitled SPEED REGULATOR FOR MANUALLY OPERATED SOUND PRODUCTION APPARATUS filed on May 30, 1972, Ser. No. 257,698 for regulating the tape speed. The apparatus includes drive means which permits the tape to be instantly rewound a desired amount to replay sections of the recorded tape. This feature is particularly helpful to the operator when doing memory work encountered in many instructional tapes.

Apparatus embodying the present invention includes a base assembly on which is slidably positioned a carriage assembly including a tape playback head and means for coupling the head to an amplifier for reproducing audio information recorded on a magnetic tape. The carriage includes manually operated drive means selectively engaging tape carrier means positioned on the base assembly to transport the tape across the recording head. Means cooperating between the base and the carriage shift the carriage between playback and rewind positions to alternately position the head into and out of contact with the magnetic tape and the drive mechanism in forward and rewind drive positions.

It is an object of the present invention to provide a unique manually operated tape playback apparatus.

Another object of the present invention is to provide novel drive means for manually operating a tape transport.

An additional object of the present invention is to uniquely incorporate a tape speed governor in conjunction with a tape capstan.

Still a further object of the present invention is to provide unique means for providing instant rewind of magnetic tape for replay in memory work.

These and other objects of the present invention will become apparent upon reading the following specification together with the accompanying drawings in which:

DETAILED DESCRIPTION OF THE PREFERRED EMBODIMENT

Figure 1:
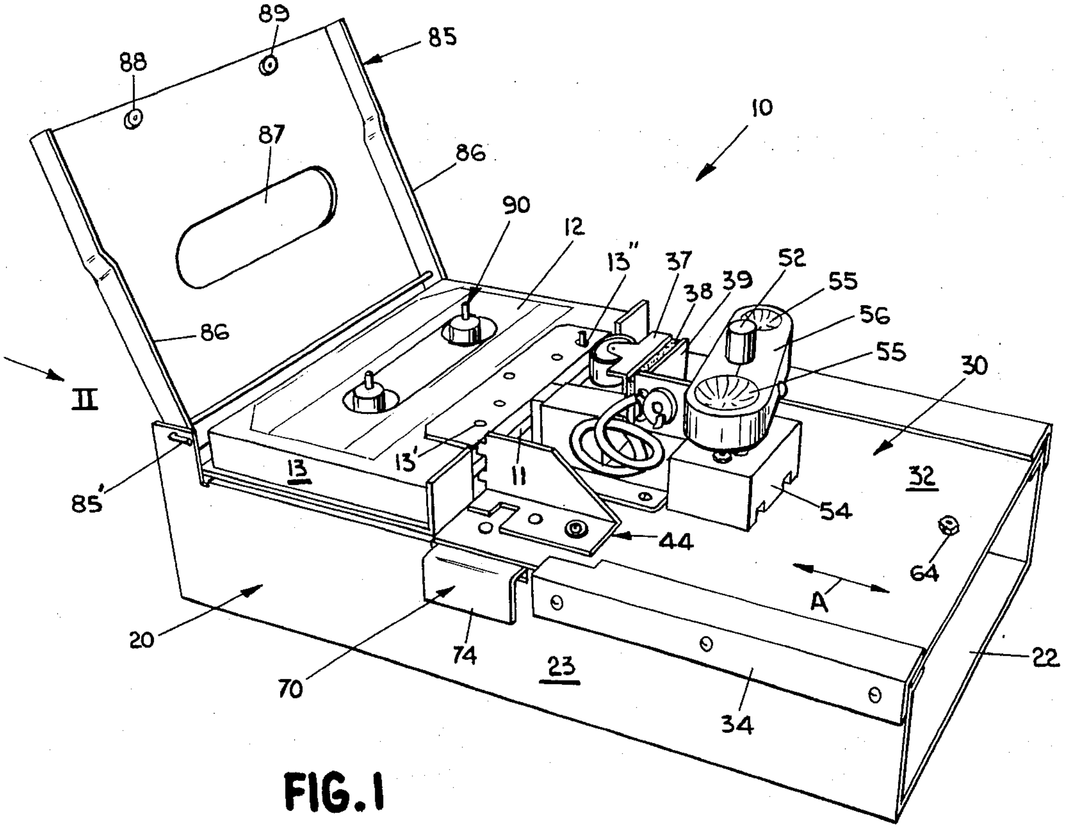
FIG. 1 is a perspective view of the tape playback apparatus of the present invention shown with a tape cartridge inserted into a position for playback with the cartridge cover in its open position.

The tape playback apparatus 10 shown in FIG. 1 comprises a base assembly 20, a drive carriage assembly 30 slidably mounted on the base and actuated by means of cooperating means 70, and a tape carrier assembly 90 including a cover 85 specifically adapted to securely hold therein a conventional tape cartridge 12 with playback tape 11 therein, although reel-to-reel tapes can also be employed with the apparatus illustrated in FIG. 1.

Although the preferred embodiment described herein incorporates a tape speed regulator for maintaining the tape playback speed of approximately 1 ⅞ inches, different tape speeds can be employed with the present invention and other embodiments may not employ the tape speed regulator. For a detailed understanding of the construction and operation of the apparatus, reference is had to FIGS. 2 through 10.

Figure 2:
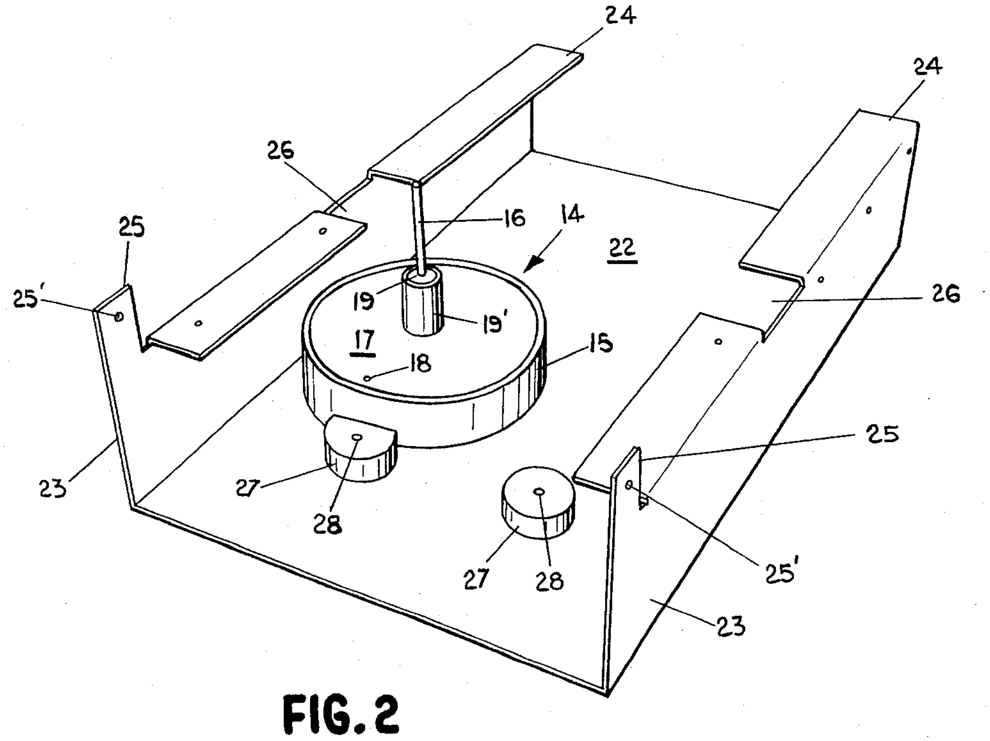
FIG. 2 is a front perspective view of the base assembly showing the capstan and governor subassembly as viewed from the direction indicated by the arrow II in FIG. 1.

The base assembly 20 comprises, as seen in FIG. 2, an elongated generally U-shaped housing comprising a floor 22 and side walls 23, each with inwardly curved upper edges 24. The housing can conveniently be formed of aluminum or other suitable material. At the front of each of the side walls 23 is an upwardly projecting tab 25 having an aperture 25' therein. Tabs 25 provide mounting means for the cover 85 (FIG. 1) by means of a pin 85' which extends through apertures 25' and the tabs and corresponding apertures in the sides of the cover as described hereinafter.

As seen in FIG. 2, each of the inwardly curved edges 24 includes a cutaway recessed slot 26 therein for accommodating the cooperating means 70. Slots 26 are in alignment with each other across floor 22. A pair of shaft receiving bosses 27 are fixedly positioned on floor 22 and each includes apertures 28 therein for receiving shafts of the tape carrier as described below with reference to FIG. 5.

The base assembly 20 additionally includes a tape speed regulator 14 having an upwardly projecting shaft 16 which serves as a tape capstan and engages the magnetic tape as described below. The speed regulator 14 is of the type described in detail in my copending application identified above and incorporated by reference herein. A brief description, however, is presented here.

Regulator 14 comprises a cup-shaped brake drum 15 with a circular upstanding shoulder. Drum 15 is suitably anchored to the floor 22 of the base. Within the drum 15 is rotatably mounted a spool 17 including a brake shoe positioned around the outer periphery thereof and actuated by centrifugal force as the spool and capstan rotate to move outwardly and contact the inner walls of brake drum 15. The brake shoe is anchored to the spool 17 by means of a pin 18 and limits the rotational speed of the spool by contacting the drum as the desired tape playback speed is exceeded. Capstan 16 is anchored to the spool 17 and includes a boss 19 with a frictional surface covering 19' such as rubber. Boss 19 is adapted to be contacted by the drive means of the movable carriage 30 to rotate the speed regulator while the capstan 16 interconnects the regulator with the magnetic tape as described below.

Having described the base assembly including the speed regulator, the description of the tape playback apparatus continues with a description of the carriage assembly and drive means thereon which is slidably positioned on the base assembly and actuated by the cooperating means.

Figures 3, 4:
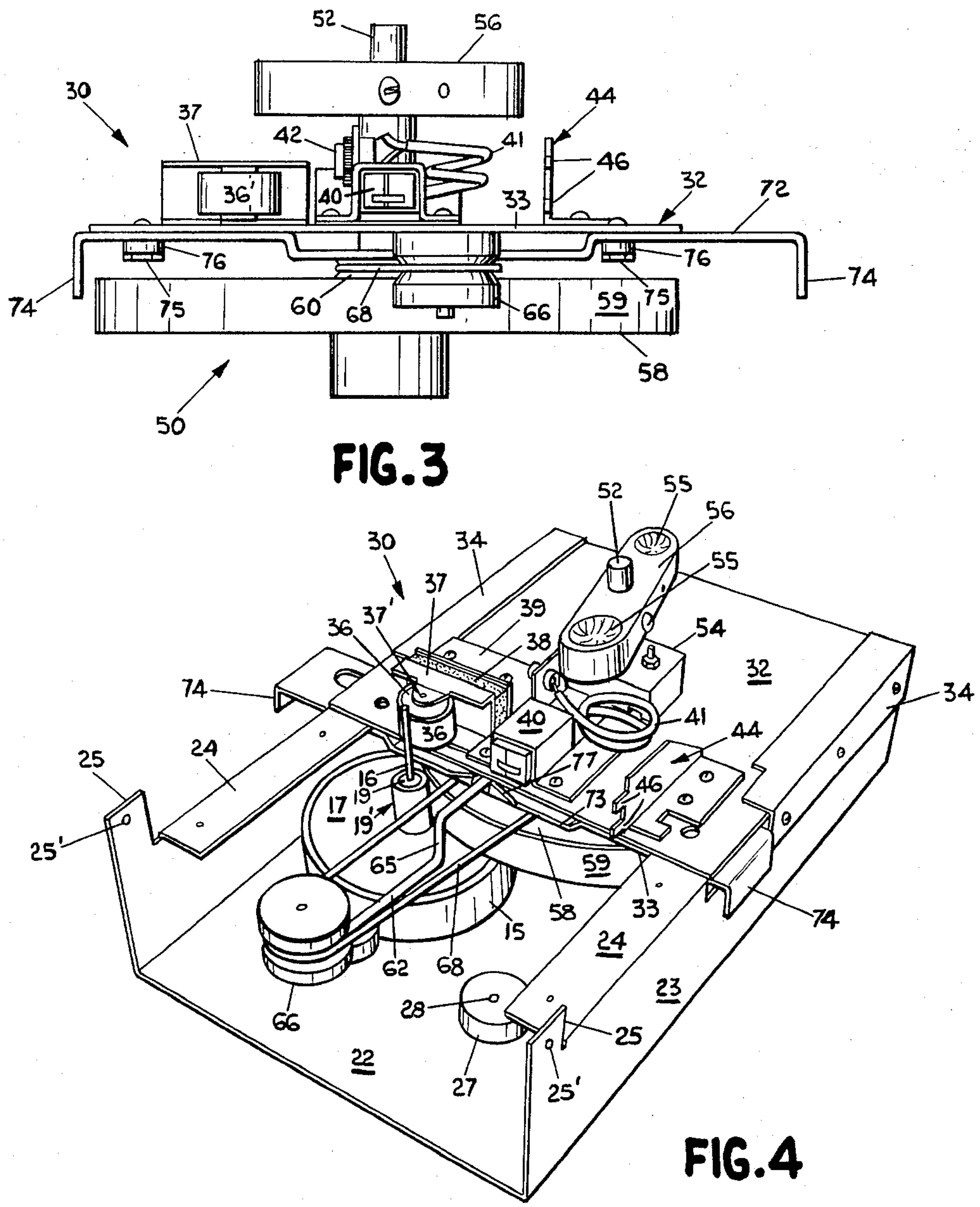
FIG. 3 is a front view of the drive carriage assembly and the tape playback head.
FIG. 4 is a front perspective view of the drive carriage positioned on the base assembly showing the interconnection of the flywheel thereon with the capstan.
Figure 7:
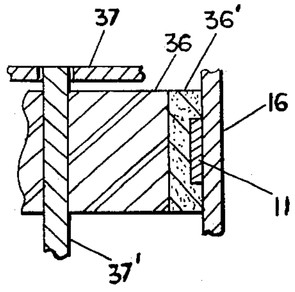
FIG. 7 is a cross-sectional view of the tape drive capstan and pressure roller with the magnetic tape positioned therebetween during playback.

As best seen in FIGS. 3 and 4, the carriage assembly 30 comprises a generally flat mounting plate 32 positioned to slide along the rearward portion of the edges 24 of the base assembly. Plate 32 is guided by means of a pair of angle brackets 34 positioned on side walls 23 of base 20 and extending over the edges of the plate in loose contact therewith to allow the plate to slide freely fore and aft as indicated by arrow A (FIG. 1). Along the leading edge 33 of plate 32 there is positioned tape indexing means including a pressure roller 36 and a guide assembly 44 spanning pick-up head 40. Roller 36 is rotatably mounted to a bracket 37 by a pin 37' and comprises a nylon roller having a resilient deflectable covering 36' as best seen in FIG. 7. The covering can, for example, comprise a rubber band fitted over the nylon roller. Bracket 37 is spaced above the top surface of plate 32 and is, in turn, mounted to a second bracket 39 by means of a resilient pad 38 of, for example, foam polymeric material, to permit the pressure roller 36 to move into contact with the capstan 16 with a resilient biasing force as illustrated in FIG. 4. Bracket 39 is suitably attached to plate 32.

Adjacent the pressure roller is mounted a magnetic tape playback head 40 of conventional design and electrically coupled to a jack 42 by conductor 41 to permit the electrical interconnection of the head to a suitable amplifier as described below. On the side of the recording head 40 opposite roller 36 there is positioned a tape guide assembly 44 which has a pair of vertically spaced members 46 extending therefrom and adapted to span the upper and lower edges of the magnetic tape 11 (FIG. 1) thereby holding the tape in vertical registration with the playback head 40. It is noted here that roller 36, playback head 40, and guide 44 are positioned along the leading edge of the plate 32 in generally vertical registration along the path of the magnetic tape to guide the tape across the playback head at the desired regulated playback speed.

Also positioned on the carriage 30 is the drive means 50 which includes a drive shaft 52 extending through plate 32 by means of a bearing block assembly 54. Fixedly positioned on the extension of shaft 52 above plate 32 is a turning arm 56 having a pair of finger depressions 55 such that the operator can easily manually rotate shaft 52 in a clockwise direction for playback or a counterclockwise direction for rewind. Below the plate 32 and spaced therefrom, as seen in FIG. 3, a flywheel 58 is coupled to shaft 52. Flywheel 58 has a frictional covering 59 such as a rubber band positioned around its peripheral edge. As seen in FIG. 4, the flywheel is in a position to contact the boss 19 of the regulator 14 when the carriage 30 is in the playback position and drives the speed regulator mechanism when shaft 52 is rotated during playback.

Figure 8:
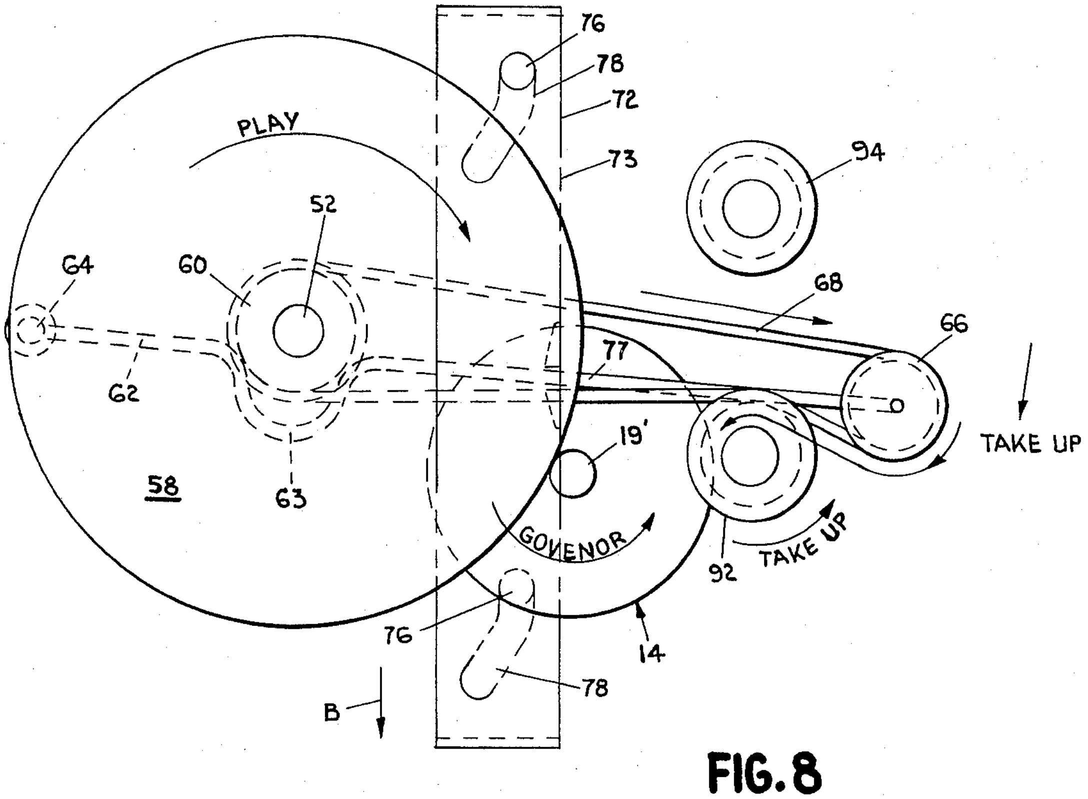
FIG. 8 is a schematic plan view of the drive mechanism shown in the playback position.

The drive means 50 further comprises, as best seen in FIGS. 3 and 8, a drive pulley 60 which is positioned between the plate 32 and flywheel 58 and can be integrally formed with the flywheel. A drive arm 62 is pivotally coupled to plate 32 at one end 64 and has an idler pulley 66 mounted to an upturned opposite end thereof. Strung around drive pulley 60 and idler pulley 66 in tension is a flexible drive band 68 which, in the preferred embodiment, comprises a rubber band. Other bands can be employed if they provide sufficient frictional contact between the band and the pulleys of the tape carrier. As shaft 52 is rotated, band 68 travels around pulleys 60 and 66. It is noted here that arm 62 includes a bend 63 (FIGS. 8 and 9) which permits the arm to be shifted from playback to rewind positions and clear pulley 60 when in a rewind position illustrated in FIG. 9.

Figure 5:
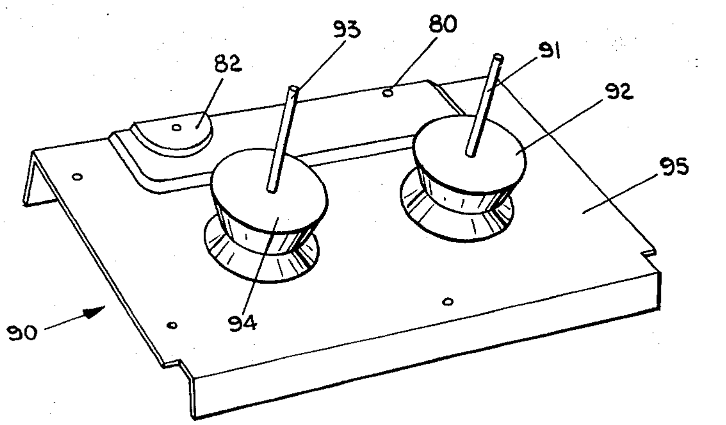
FIG. 5 is a perspective bottom view of the tape carrier and drive pulleys thereon.
Figure 6:
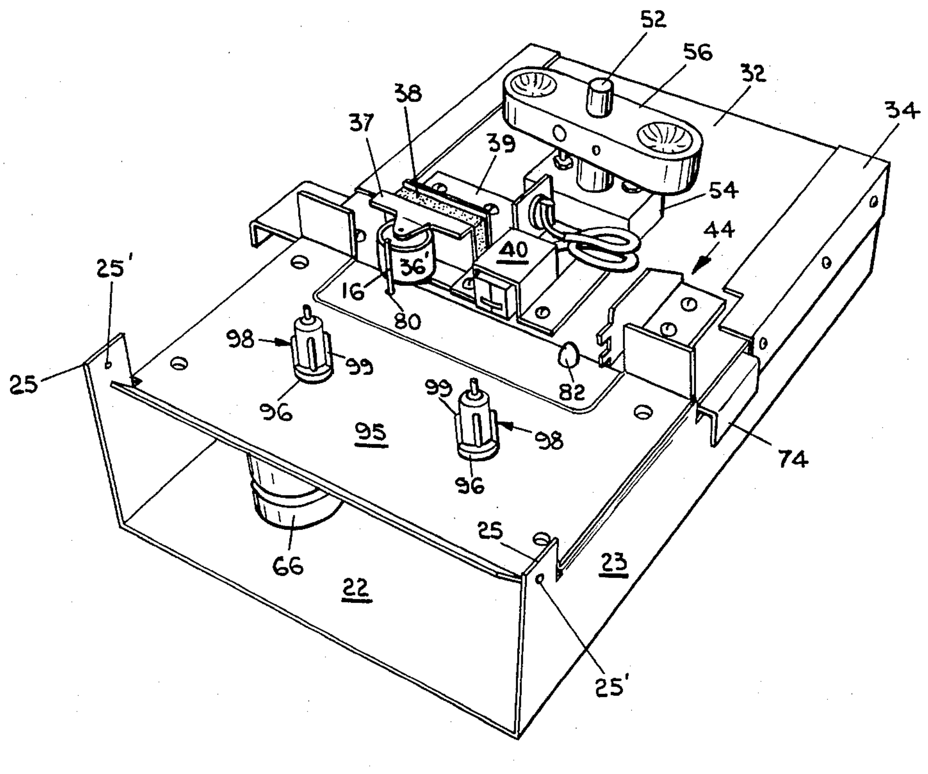
FIG. 6 is a perspective view of the playback mechanism showing the top of the tape carrier and its relative position to the drive carriage when assembled.

Drive belt 68 contacts either the tape drive pulley 92 or the tape rewind pulley 94 which are mounted on shafts 91 and 93, respectively, of the tape carrier assembly 90, as seen in FIG. 5, to alternately rotate one of these shafts thus moving the recorded tape from one reel to another. The ends of shafts 91 and 93 fit into the apertures 28 of bosses 27 when the transport is positioned on the base as shown in FIG. 2. Tape carrier 90 is described in greater detail below after the description of the cooperating means. Arm 62 also includes a bend at 65 (FIG. 4) which positions idler pulley 66 in vertical registration with respect to pulleys 92 and 94 when the transport means is assembled onto the base as illustrated in FIG. 6.

Figure 9:
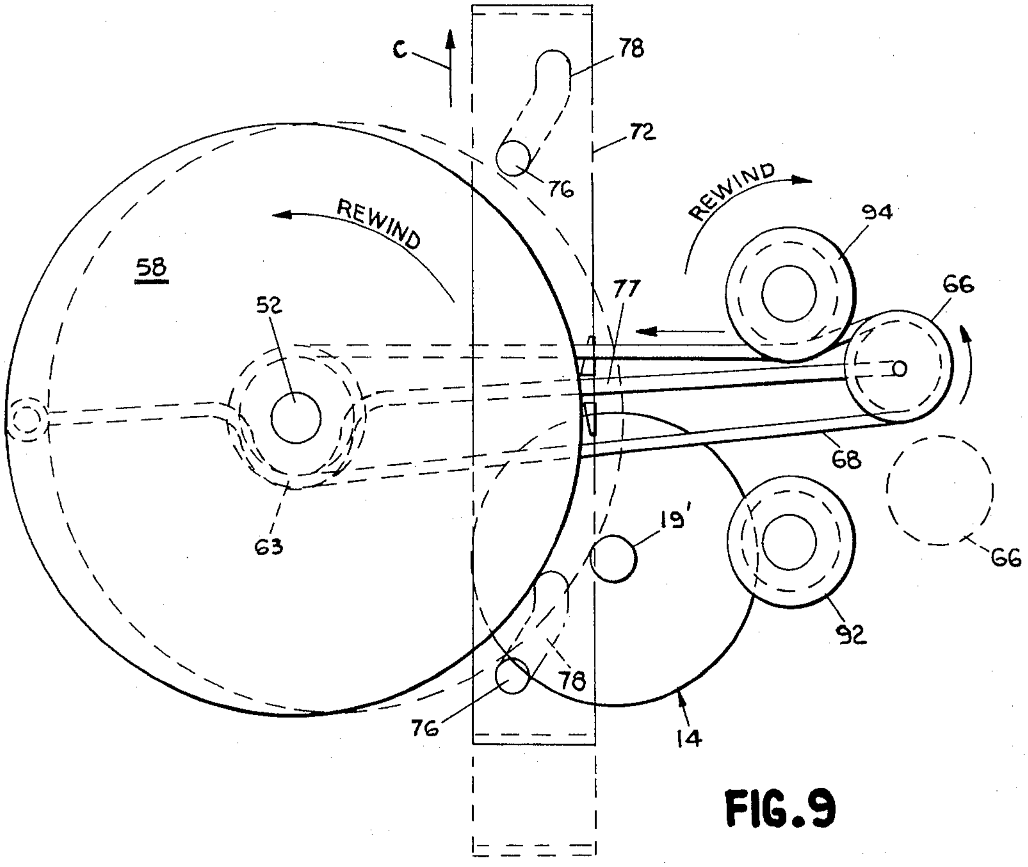
FIG. 9 is a schematic plan view of the playback mechanism shown in the rewind position.

To shift the drive means and drive carriage between the playback position shown in FIG. 8 and the rewind position illustrated in FIG. 9, the cooperating means 70 are employed. Means 70 comprises a sliding cam plate 72 slidably fitted within the recessed apertures 26 in the base between the base and plate 32 as seen in FIGS. 3 and 4. Plate 72 includes a pair of downwardly turned ends 74 (FIGS. 3 and 4) which captures the plate and limits its lateral motion. A pair of cam members such as rollers 76 are rotatably mounted on posts 75 fixedly attached to the plate 32 and depending downwardly therefrom as seen in FIG. 4. Rollers 76 engage camming surfaces or member 70 comprising arcuate slots 78 (FIGS. 8 and 9) in the plate 72. By extending through slots 78, rollers 76 provide interconnection between the carriage 30 and cooperating means 70 while the slots 26 provide interconnection between the cooperating means 70 and the base member 20. Along the leading edge 73 of plate 72 there is formed a guide slot 77 with upstanding shoulders which capture arm 62 as seen in FIGS. 4, 8 and 9.

It is seen, therefore, when cam plate 72 is moved in a direction indicated by arrow B (FIG. 8) to the playback position, carriage 30 is shifted forwardly to engage the tape (FIG. 1) while drive arm 62 shifts to engage drive band 68 with pulley 92. On the other hand, when cam plate 72 is moved in a direction indicated by arrow C (FIG. 9) to the rewind position, carriage 30 is shifted rearwardly out of contact with the tape and drive arm 62 shifts to engage band 68 with the rewind pulley 94. This arrangement provides instant rewind of the tape when shaft 52 is rotated counterclockwise and with a minimum of drag since the tape is disengaged from the head, the indexing means and the speed regulator. In the preferred embodiment, pulleys 92 and 94 are approximately the same size. If faster or slower rewind is desired, however, the diameter of pulley 94 can be decreased or increased respectively.

The tape carrier subassembly 90 comprises a plate 95 which is positioned by means of screws or the like onto the forward portions of edges 24 of the base member 20 such that the ends of shafts 91 and 93 extend into guided and rotatable engagement with bosses 27 (FIG. 2). A pair of bushings 96 (FIG. 6) are fitted into the plate 95 to permit the rotatable passage of shafts 91 and 93 through plate 95. Spindles 98 having reel engaging ribs 99 around the periphery thereof are fixedly attached to the ends of shafts 91 and 93 thereby holding the shafts in position. Pulleys 92 and 94 on the opposite side of plate 95 prevent the shafts from being lifted out of the assembly.

Plate 95 additionally includes an aperture 80 along the edge thereof through which the capstan 16 extends, as seen in FIG. 6, when the transport is fitted onto the base. Also positioned along the edge of plate 95 is a post 82, as best seen in FIG. 6, which serves the dual purpose of a tape guide and cartridge receiving post for alignment of the tape cartridge 12 (FIG. 1) with the tape transport. When reel-to-reel tapes are employed, the indexing means on the carriage 30 (i.e., the pressure roller and the guide means) together with post 82 provide vertical registration as well as horizontal registration (i.e., contact of the tape against head 40) for the magnetic tape.

To facilitate the mounting of a tape cartridge 12 having magnetic tape 11 therein, the cover plate 85 (FIG. 1) is provided with inwardly curved sides 86 which securely grip the sides 13 of cartridge 12 when the cover is in its closed position. Cover 85 additionally includes an aperture 87 therein to permit clearance of the spindles 98 and shafts 91 and 93 therethrough. Additionally, cover plate 85 includes a post 88 along the edge which fits within a standard aperture 13′ in the cartridge 12 to assist in registering the cartridge with respect to the playback mechanism when the cover is closed. A bushing 89 also positioned near the edge of the cover fits over the extending capstan 16 when the cover is in its closed position and extends into the annular space of aperture 13″ in the cartridge to further provide registration and support between the cartridge and the playback mechanism. Bushing 89 also supports the free end of capstan 16.

Figure 10:
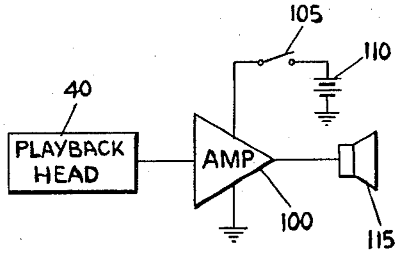
FIG. 10 is an electrical circuit diagram shown in block form of the tape playback apparatus.

As seen in FIG. 10, the playback head 40 is coupled to a suitable amplifier 100 powered by a battery 110 coupled to the amplifier by a power switch 105. The amplifier 110 drives a speaker 115 to reproduce the recorded information. If desired, the circuit of FIG. 10 can conveniently be mounted to the base assembly near the rear where it will not interfere with the drive mechanism or carriage. Instead of providing an integral amplifier and speaker, however, a pick-up cable can be inserted into jack 42 and connected to an available amplification system for playback of the recorded tape.

In operation, the cartridge is inserted, as shown in FIG. 1, such that the upwardly extending post 82 (FIG. 6) engages aperture 13′ in the cartridge from the bottom side and the spindle 16 projects through aperture 13″ behind tape 11. Cover 85 is then snapped into its closed position and cam plate 72 is moved to the user's right, as shown in FIG. 8. Shaft 52 is then rotated in a clockwise direction by the arm 56 to transport the tape across the pick-up head. As seen in FIG. 7, the tape 11 is securely held against the capstan 16 by the resilient cover 36′ on roller 36 which deflects around the tape 11 and contacts the capstan above and below the tape to fix the vertical position of the tape as well as transmit speed regulating forces from the capstan 16 attached to the braking spool 17, as described above, to regulate the tape playback speed. As the playback speed in exceeded, a pronounced drag can be felt by the operator. This tactile feedback aids the operator in rotating the shaft 52 at the desired speed for the 1 ⅞ inch tape employed by the preferred embodiment.

When it is desired to rewind the tape, as for example, during rote memory work, the cam plate 72 is shifted to the user's left, as shown in FIG. 9, which causes the carriage 30 to move rearwardly and disengage the tape while shifting the drive arm over to the rewind pulley 94. Arm 56 is then rotated in a counterclockwise direction until the desired amount of tape has been rewound after which cam plate 72 is returned to the playback position and arm 56 rotated in a clockwise direction once again for playback.

It will become apparent to those skilled in the art that various modifications to the present embodiment can be made by those skilled in the art. For example, the apparatus can be employed for recording as well as playback by providing conventional electrical circuitry and a recording microphone. Different tape speeds can also be utilized. Additionally, modifications to the specific structure employed in the preferred embodiment shown can be made. These and other modifications will, however, fall within the scope and spirit of the present invention as defined by the appended claims.

The embodiments of the invention in which an exclusive property or privilege is claimed are defined as follows:

1. In a manually operated mechanism for reproducing information recorded on a tape comprising:

tape carrier means including a pair of drive spindles;

a base assembly including a carriage movably positioned on said base assembly;

a tape playback head positioned on said carriage for movement between tape engaging and non-engaging positions; and manually operated drive means positioned on said carriage and selectively engageable with one of said drive spindles for alternatively rotating one of said spindles to transport said tape across said playback head in first or second directions.

2. The apparatus as defined in claim 1 and further including cooperating means coupled to said carriage means and to said drive means to position said playback head in a tape engaging position when said drive means is actuated to move said tape in a first direction, and to position said playback head in a non-engaging position when said drive means is actuated to move said tape in a second direction.

3. The apparatus as defined in claim 2 and further including a speed regulator coupled to said drive means and to said tape for regulating the speed of said tape moving across said playback head in said first direction.

4. The apparatus as defined in claim 3 wherein said drive means comprises:

a manually rotated drive shaft, a drive arm pivotally coupled at one end to said carriage, and including an idler pulley at an opposite end thereof, a drive belt coupled between said drive shaft and said idler pulley and movable therearound as said drive shaft is rotated, and cooperating means for shifting said drive arm between said spindle drive pulleys to rotate one of said drive pulleys to move said tape in a first direction and the other of said drive pulleys to move said tape in the second direction.

5. The apparatus as defined in claim 4 wherein said cooperating means is coupled between said base assembly and said carriage and shifts said carriage between a forward position where said playback head engages said tape and a rearward position as said drive arm is shifted between said spindle drive pulleys.

6. A manually operated tape playback apparatus comprising:

a base assembly, a tape carrier assembly positioned on said base assembly and including means thereon for supporting and transporting tape, a drive carriage movably positioned on said base assembly and including manually operated drive means selectively engaging said carrier assembly to transport said tape in first or second directions, said carriage further including a tape playback head positioned to detect information recorded on said tape when said tape is transported in one of said directions, and cooperating means engaging said drive carriage and said base assembly for moving said carriage and actuating said drive means to selectively engage said tape carrier.

7. The apparatus as defined in claim 6 wherein said drive means comprises:

a drive shaft rotatably positioned on said carriage and including means for manually rotating said shaft, a drive arm pivotally coupled to said carriage and extending to said carrier to selectively engage said carrier, said arm including means supporting a drive member thereon, and means coupling said drive member to said drive shaft.

8. The apparatus as defined in claim 7 wherein said cooperating means includes means engaging said drive arm to pivot said drive arm and therefore said drive member between first and second carrier engaging positions.

9. The apparatus as defined in claim 8 wherein said means for supporting said drive member on said drive arm comprises an idler pulley, said means coupling said drive member to said drive shaft comprises a drive pulley and said drive member comprises an endless loop belt positioned between said idler and drive pulleys and movable therearound when said drive shaft is rotated.

10. The apparatus as defined in claim 9 wherein said tape carrier comprises first and second tape spindles, each including drive pulleys coupled thereto, said drive pulleys positioned to be alternately engaged by said drive member as said cooperating means is actuated to pivot said drive arm between first and second positions.

11. The apparatus as defined in claim 10 wherein said cooperating means comprises a sliding cam plate guidably supported on said base assembly and including a camming surface engaging a cam member positioned on said carriage to shift said carriage and said playback head thereon toward and away from the tape.

12. A manually operated tape playback apparatus comprising:

a base assembly, a drive carriage assembly slidably mounted to said base assembly including a tape playback head and manually operated drive means, means cooperating between said base and carriage to shift said carriage and drive means between playback and rewind positions, and a tape carrier including means selectively engaged by said drive means for transporting a tape across said playback head when said drive means is operated.

13. The apparatus as defined in claim 12 wherein said carrier includes a pair of spindles for receiving tape reels, each of said spindles including a drive pulley mounted thereon.

14. The apparatus as defined in claim 13 wherein said drive means comprises:

a drive arm movably coupled to said carriage and extending toward said carrier, said arm including a pulley mounted at the end remote from said carriage, a manually rotated drive shaft positioned on said carriage, a drive belt coupled to said drive shaft and said drive arm pulley to be moved therearound as the drive shaft is rotated, and means coupling said drive arm to said cooperating means to engage said drive belt with one of said drive pulleys on said carrier when said cooperating means is in the playback position and the other of said drive pulleys on said carrier when said cooperating means is in the rewind position.

15. The apparatus as defined in claim 14 wherein said cooperating means comprises:

a sliding cam plate having a camming surface thereon, means formed in said base assembly for guidably engaging said cam plate, and a cam follower positioned on said carriage and engaging said camming surface on said plate such that as said cam plate is shifted between playback and rewind positions, said carriage is moved into a forward position where said head engages said tape, and rearward in the rewind position whereupon said head disengages said tape.

16. The apparatus as defined in claim 15 wherein said drive arm is pivotally mounted to said carriage and said cam plate guidably engages said drive arm such that as said cam plate is shifted between playback and rewind positions, said drive arm is pivoted causing said drive belt to alternately engage one of said drive pulleys on said carrier.

17. The apparatus as defined in claim 16 wherein said base assembly includes a centrifugal speed regulator rotatably mounted thereto and means coupling said speed regulator to said drive shaft and to said tape for regulating the speed of said tape as said apparatus is operated.

18. The apparatus as defined in claim 17 wherein said means coupling said regulator to said tape includes:

a capstan engaging one surface of said tape, and a pressure roller engaging the opposite side of said tape and engaging said capstan in a resilient manner.

19. The apparatus as defined in claim 18 and further including means positioned on said carrier for receiving a tape cartridge and for locking said tape cartridge into a fixed position on said playback apparatus.

20. In a manually operated tape playback apparatus, the combination comprising:

a base assembly including means for supporting a reel of tape thereon;

a carriage movably mounted to said base assembly;

a pick-up head and a manually operated tape drive means for transporting tape across said pick-up head, said head and drive means positioned on said carriage;

means cooperating between said carriage and said base assembly for shifting said carriage and said drive means thereon into first and second operative positions to engage said supporting means to move tape by said pick-up head in first and second directions respectively.

21. The apparatus as defined in claim 20 and further including a speed regulator coupled between said base assembly and said drive means for regulating the playback speed of said tape.

22. The apparatus as defined in claim 21 wherein said speed regulator is further coupled directly to said tape.

* * * * *

UNITED STATES PATENT OFFICE

CERTIFICATE OF CORRECTION

PATENT NO. : 3,864,745

DATED : February 4, 1975

INVENTOR(S) : Stephen A. Platt

It is certified that error appears in the above-identified patent and that said Letters Patent are hereby corrected as shown below:

Column 7, line 19:

Delete "means" (first occurrence).

Column 7, line 29:

Delete "3" and insert therefor --- 1 ---.

Signed and Sealed this

*nineteenth* Day of *August 1975*

[SEAL]

*Attest:*

RUTH C. MASON
*Attesting Officer*

C. MARSHALL DANN
*Commissioner of Patents and Trademarks*